US 8,564,856 B2

(12) United States Patent
Martin

(10) Patent No.: US 8,564,856 B2
(45) Date of Patent: Oct. 22, 2013

(54) AUTOMATIC RECOGNITION OF DOCUMENT SCAN ERROR

(75) Inventor: Nathaniel G. Martin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 333 days.

(21) Appl. No.: 12/960,616

(22) Filed: Dec. 6, 2010

(65) Prior Publication Data

US 2012/0140297 A1   Jun. 7, 2012

(51) Int. Cl.
*H04N 1/04* (2006.01)
(52) U.S. Cl.
USPC ............ 358/498; 358/496; 358/497; 358/474
(58) Field of Classification Search
USPC .................................. 358/498, 496, 497, 474
See application file for complete search history.

(56) References Cited

U.S. PATENT DOCUMENTS

| | | | |
|---|---|---|---|
| 4,685,139 A * | 8/1987 | Masuda et al. ................. | 382/112 |
| 6,032,004 A | 2/2000 | Mirabella, Jr. et al. | |
| 6,466,231 B1 | 10/2002 | Dow et al. | |
| 6,667,816 B1 | 12/2003 | Van Buren et al. | |
| 6,731,411 B1 | 5/2004 | Walforst | |
| 2003/0168388 A1* | 9/2003 | Malatesta ...................... | 209/584 |
| 2006/0202412 A1* | 9/2006 | Matsue et al. ................. | 271/292 |
| 2006/0209363 A1 | 9/2006 | Suenaga et al. | |
| 2008/0031543 A1 | 2/2008 | Nakajima et al. | |
| 2008/0239377 A1 | 10/2008 | Inada | |
| 2008/0242944 A1 | 10/2008 | Sharma | |
| 2009/0009814 A1 | 1/2009 | Sugai et al. | |
| 2012/0217188 A1* | 8/2012 | Dewitt et al. ................. | 209/576 |

FOREIGN PATENT DOCUMENTS

| | | |
|---|---|---|
| CA | 2426536 | 10/2004 |
| JP | 2005015107 | 1/2005 |

* cited by examiner

*Primary Examiner* — Houshang Safaipour
(74) *Attorney, Agent, or Firm* — Gibb & Riley, LLC

(57) ABSTRACT

A method/apparatus receives a user selection of a predetermined standard for scanning sheets of media through a user interface and optically detects marks on the sheets of media using a scanning device to produce electronic images of the sheets of media. The method/apparatus automatically determines if the electronic images comply with the predetermined standard using a processor to classify the electronic images as acceptable electronic images or non-acceptable electronic images. Then, first sheets of media corresponding to the acceptable electronic images are directed into a first sheet storage device and second sheets of media corresponding to the non-acceptable electronic images are directed into a second sheet storage device.

16 Claims, 5 Drawing Sheets

AUTOMATIC RECOGNITION OF DOCUMENT SCAN ERROR

BACKGROUND

Embodiments herein generally relate to document scanning and more particularly to devices, systems, and methods that automatically identify and sort non-acceptably scanned documents.

Frequently many copies of similar forms are scanned to archive those forms. These forms need quality assurance, but when the forms are scanned in a distributed manner, the quality assurance step may occur after the scan has taken place. The local operator may not be able to do the quality assurance, and rescanning may be difficult.

SUMMARY

An exemplary method herein receives a user selection of a predetermined standard for scanning sheets of media, through a user interface. The predetermined standard can comprise, for example, the density of marks on the sheets of media; whether at least one of the marks is located within at least one predefined area of the sheets of media; whether the marks on the sheet of media match at least one predetermined pattern; whether the marks on the sheet of media match at least one predetermined color; etc.

This exemplary method then optically detects the marks on the sheets of media using a scanning device to produce electronic images of the sheets of media. This method also automatically determines if the electronic images comply with the predetermined standard using a processor to classify the electronic images as being acceptable electronic images or non-acceptable electronic images.

Then, first sheets of media corresponding to the acceptable electronic images are directed into a first sheet storage device of the sheet storage devices using a sheet feeder under control of the processor and second sheets of media corresponding to the non-acceptable electronic images are directed into a second sheet storage device of the sheet storage devices using the sheet feeder under control of the processor. If necessary, the sheets of media can be temporarily stored in a sheet buffer while the processor performs the process of determining whether the electronic images comply with the predetermined standard. Further, the processor can direct that the acceptable electronic images be stored within a computer readable storage medium device.

This exemplary method notifies the user that at least one of the sheets of media comprises a non-acceptable electronic image and has been directed into the second sheet storage device, through the user interface.

An exemplary apparatus herein comprises a user interface that receives the user selection of the predetermined standard for scanning the sheets of media. A processor is operatively connected to the user interface and a scanning device is operatively connected to the processor. The scanning device optically detects the marks on the sheets of media to produce electronic images of the sheets of media. The processor automatically determines if the electronic images comply with the predetermined standard to classify the electronic images as being acceptable electronic images or non-acceptable electronic images.

A sheet feeder is positioned adjacent to the scanning device and is operatively connected to the processor. At least two sheet storage devices are positioned adjacent to the sheet feeder. The sheet feeder directs first sheets of media corresponding to the acceptable electronic images into a first sheet storage device of the sheet storage devices under control of the processor, and the sheet feeder also directs second sheets of media corresponding to the non-acceptable electronic images into a second sheet storage device of the sheet storage devices under control of the processor.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
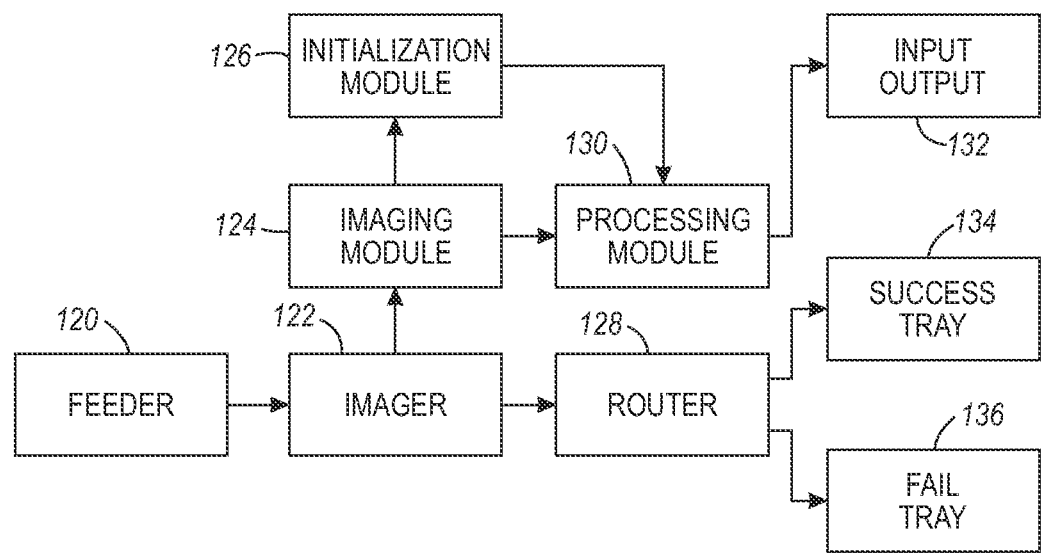
FIG. 1 is a schematic diagram of a device according to embodiments herein.

As mentioned above, a local operator may not be able to do quality assurance while performing scans. Therefore, the embodiments herein automatically recognize and notify the local operator of a scan error before the image is shipped to central storage. More specifically, the embodiments herein use document categorization to generate at least two categories: good scans and bad scans. If a bad scan is seen, the device may either route the offending paper to a different tray or stop the machine. The operator can then look at the paper and the image to determine what has gone wrong.

One example of an implementation of the embodiments herein is an automobile rental agency's front desk. Such an agency has customers sign contracts at the front desk and scans these documents into a repository that is maintained at a different location (e.g., in another state).

A problem can occur because the images are not reviewed until they are received at the repository. If a non-acceptable scan is identified at the central location, the central location notifies the local office that had scanned the form. The local office that had scanned the non-acceptable form then needs to track down the original paper form to rescan it. This requires the local office to store the paper forms until the repository notifies them that it is alright to dispose of them. However, in some distributed scan environments, documents are scanned and then shipped to storage at a different location, which may make the documents even harder to locate for rescan once a scan error is discovered.

When the embodiments herein are applied to the above rental car agency example, the scanned images are automatically reviewed for non-acceptable scans when they are first created (scanned) so that the documents only need to be on hand at that time. The predetermined standard for accurate scanning of the forms is not difficult; the rental agency simply needs an image of the signature and enough of the form to show which contract has been signed.

The embodiments herein train a document categorization system such as Document Image Categorization Engine (DICE) or Generic Visual Categorizer (GVC) to recognize the forms. Alternatively, faulty scans can be determined by generic criteria such as the density of marks on the sheets of media; whether at least one of the marks is located within at least one predefined area of the sheets of media; whether the marks on the sheet of media match at least one predetermined pattern; whether the marks on the sheet of media match at least one predetermined color; etc. Poorly imaged documents and documents that are incorrectly loaded with the desired documents would not match the predetermined parameters learned by the categorization engine and would fall into a non-acceptable category.

The embodiments herein notify the operator of a non-acceptable scan image either by shutting down the scanner (so the offending document will be on the top of the scanned documents) or by routing the document to a different output tray so all offending documents could be saved (and reimaged if necessary).

One advantage of the embodiments herein is that they require supporting as little as two classes of documents, acceptable and non-acceptable. Therefore, the system is easy to train. Also since there are only two categories of document, trays can be provided to accommodate each. In more complex embodiments, multiple types of documents can be recognized and sorted.

As shown in FIG. 1, one example of an embodiment herein includes four software modules and five hardware elements. The software modules include the training (initialization) module 126, the imagine module 124, the processing module 130, and the image output 132. The hardware elements include the feeder 120, the imager (scanner) 122, the router (feeder) 128, the fail (non-acceptable) tray 136, and the success (acceptable) tray 134.

The feeder 120 can be any standard document handler. (i.e., a document handler). Similarly, the imager 122 is the device that optically detects the image of the document. Some scanners have two scan bars and image both sides of the paper at the same time. Other optical sensors and cameras can also be used as imagers with embodiments herein.

The imaging module 124 processes the images for clarity. For example, the imaging module 124 can apply despeckle and deskew. This imaging module 124 can be tuned to the particular type of document being processed. For example, if a document is a pink form, this imaging module 124 could remove the color and increase the contrast between the paper and the marks on the paper.

The processing module 130 takes images as produced by the imager 122 and enhanced by the imaging module 124 and decides whether the image is acceptable. As mentioned above, the processing module may use either algorithmic or learned decision techniques.

The training module 126 sets up the processing module 130 to recognize the document. If the processing module 130 uses a learned decision technique, it uses images taken from the imaging module 124.

The image output 132 allows retrieving the electronic images from the device. The image output 132 may deliver only the correct images or can produce a stream of all of the images created, tagged with information that indicates whether the image is acceptable or not. By delivering all of the images, the downstream systems can decide what to do with the failed images. For example, a downstream system may apply additional checks to determine where the bad images are originating. For example, the system can determine if there is operator error or mechanical failure.

The embodiments can operate in different phases: the initialization phase and the operational phase. In the initialization phase, the system is set up to recognize (learn) the type of form that will be fed into the system using the training module 126. In the operational phase, the forms are fed into the system using the feeder 120, scanned using the imager 122 and imaging module 124, and based on the recognition by the processing module 130 (set up by the initialization module 126) are routed to either the success tray 134 or fail tray 136.

The initialization phase 126 may take place in different ways depending on whether the processing module 130 is algorithmic or learned. If the processing module 130 is algorithmic, the initialization phase will involve entering the algorithm for recognizing the document. For example, the document may be legitimate if it has a particular pattern on it, such as a bar code. Programs for extracting and managing bar codes exist, so the initialization phase for this type of processing module 130 will involve entering the program for extracting and managing the bar code. Similarly, for density, marks located within a predefined area, a predetermined pattern; marks of a predetermined color; etc., the predetermined characteristics can be set according to generic standards, or can be adjusted by the user through the user interface.

If the processing module 130 is learned, a number of known accurate forms are scanned and a composite model of the forms is created so new forms can be compared against the composite module. To initialize the learned processing module 130, the forms are scanned using the imager 122 and passed through the imaging module 124. By passing the documents through the imager 122 and the imaging module 124, the peculiarities of the scanner and processing of the particular machine can be incorporated into the training by the initialization module 126.

The operational phase has two paths: the paper path and the image path. The paper path routes the paper document through the machine to the success tray 134 if it is recognized as a legitimate instance of the type of form being scanned and to the fail tray 136 (or the scanner is shut down) if it is not recognized as an instance of the forms being scanned. The image path takes the image, processes it using the processing module 130 and sends it to the image output 132 if it is recognized, as an instance of the forms being scanned. The processing module 130 on the image path also sends a signal to the router 128 in the paper path indicating whether or not the image was recognized, allowing it to route the document to the success tray 134 or fail tray 136 (or shut down) as appropriate. Properly scanned images are sent to the image output 132, which can be local or remote.

Figure 2:
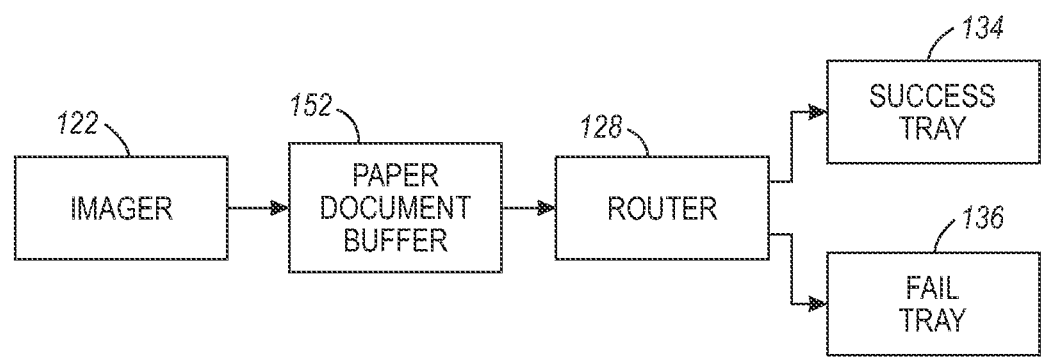
FIG. 2 is a schematic diagram of a device according to embodiments herein.

One issue can occur if there is a mismatch between the speed of the image recognition and the speed of the document scanning. If the image recognition taking place in the processing module 130 is complicated, it may take more time to recognize whether or not the document is legitimate than it does to scan the document. In this case a document buffer 152 is added to the routing module between the imager 122 and the router 128, as shown in FIG. 2. In other embodiments, the buffer 152 can be located between the feeder 120 and the imager 122 to cause the sheets to wait to be scanned, to match processing speed. The buffer 152 stores the pages while the processing module 130 decides whether the scan was acceptable or not.

Figure 3:
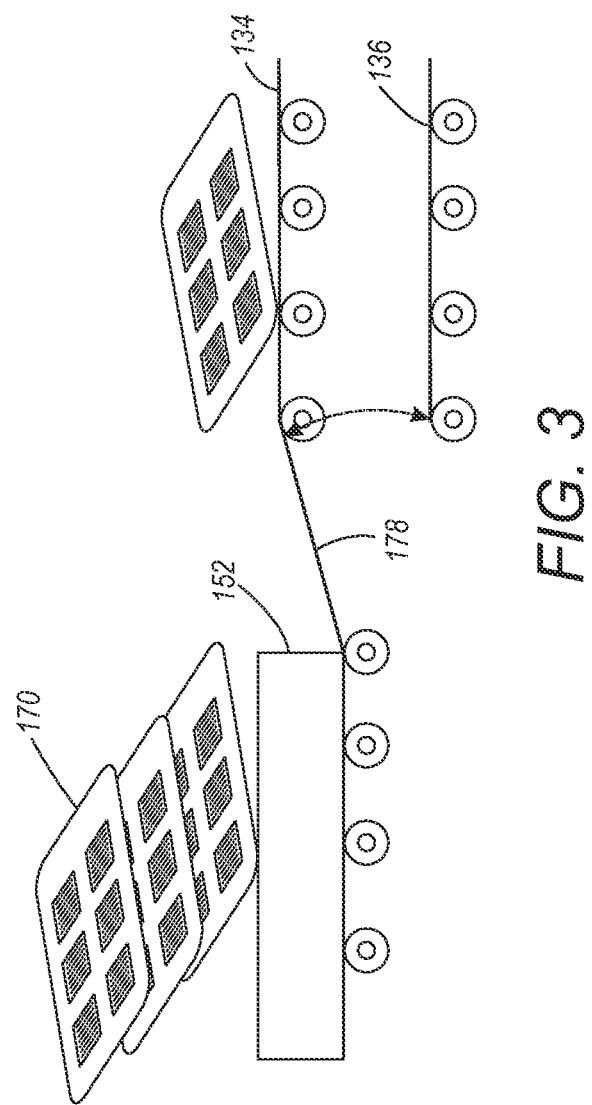
FIG. 3 is a schematic diagram of a device according to embodiments herein.

More specifically, as shown in FIG. 3, a stack of media sheets 170 are sent to the paper document buffer 152 from the imager 122. Within the buffer 152, pages 170 are laid on the top of the stack and removed from the bottom of the stack (or vice versa). The paper document buffer 152 is needed only if the processing takes longer than the scanning. If the processing is shorter than the scanning, the processor can wait. The paper documents 170, on the other hand, cannot wait because the user needs to remain at the device until the pages are processed.

An alternative to including a paper document buffer 152 with the router is to simplify the document recognition. For example, in the rental agency task mentioned above, the only thing the rental agency really needs is a scan of the signature on the contract. In this case, distinguished marks are recognized around the signature area of the contract. If such marks are recognized, the system assumes that the signature was visible.

The router 128 has a single input paper path and two output paper paths: the success path and the fail path. Based on the signal coming from the processing module 130, the router 128 sends each page either to the success or fail path. As shown in FIG. 3, the router 128 could be implemented with a member 178 that raises and lowers, thereby directing the paper into the correct path.

Thus, the embodiments herein use machine learning based image document categorization to recognize scan errors and can choose different methods for recognizing good scans based on the complexity of the task. Also, the embodiments herein can use special marks to recognize that a particular area of a document has been scanned and can apply image categorization to a selected part of the form. The embodiments herein can modify the scan process to allow for re-scan or removal and a document buffer can be used to hold paper while decisions are being made.

The embodiments herein provide a way to help the person scanning catch bad scans while they are still at the machine. This is an aspect of scanning on hallway machines. If users cannot inspect the scans before leaving the machine, it is difficult to rescan.

Figure 4:
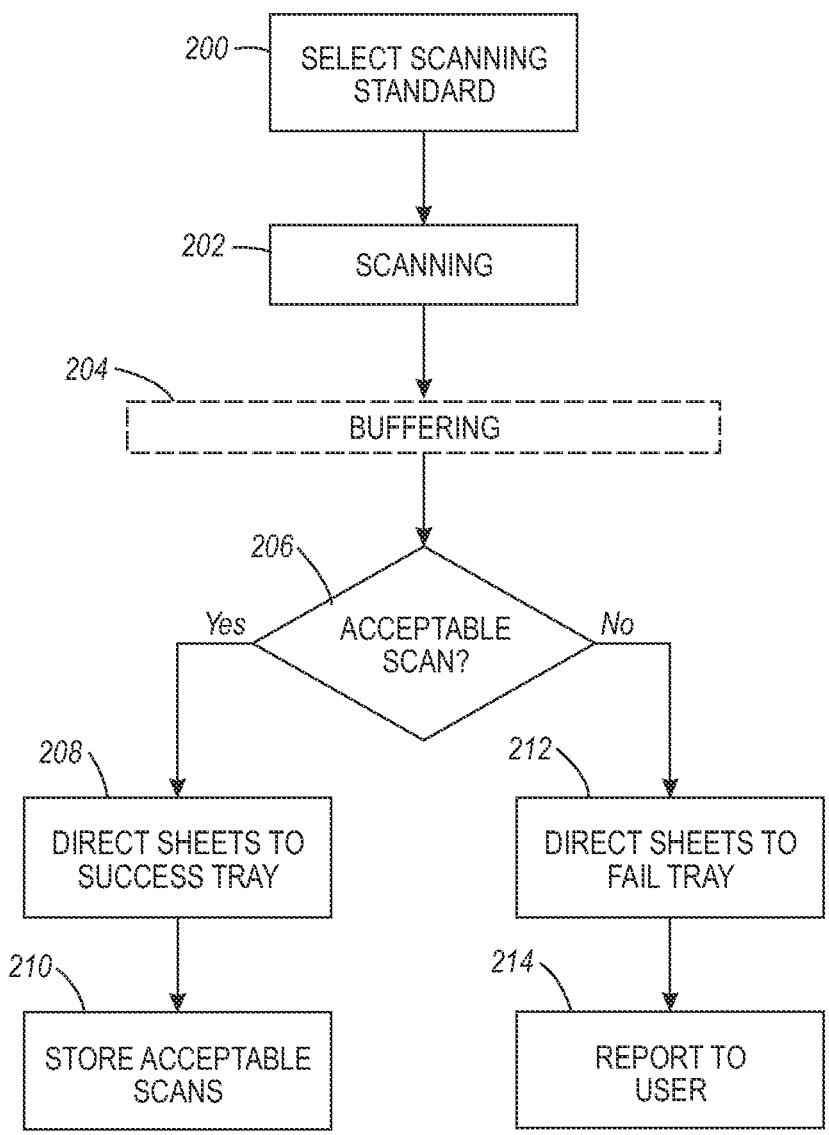
FIG. 4 is a flow diagram illustrating embodiments herein.

FIG. 4 illustrates an exemplary method herein in flowchart form that receives a user selection of a predetermined standard for scanning sheets of media, through a user interface in item 200. Item 200 corresponds to the initialization/learning process mentioned above. For example, the user can run a sophisticated learning routine in item 200, or simply select a form from a menu of forms for which training/learning has already been completed. Similarly, the user can select a predetermined standard from a menu of items such as the desired density of marks on the sheets of media; whether at least one of the marks is located within at least one predefined area of the sheets of media; whether the marks on the sheet of media match at least one predetermined pattern; whether the marks on the sheet of media match at least one predetermined color; etc.

This exemplary method then optically detects the marks on the sheets of media using a scanning device to produce electronic images of the sheets of media in item 202. If necessary, the sheets of media can be temporarily stored in a sheet buffer in item 204 to allow the processor to perform the process of determining whether the electronic images comply with the predetermined standard. In item 206, the method shown in FIG. 4 also automatically determines if the electronic images comply with the predetermined standard (using a processor) to classify the electronic images as being acceptable electronic images or non-acceptable electronic images.

Then, if a scan is determined to be acceptable in item 206, such sheets (e.g., "first" sheets) of media corresponding to the acceptable electronic images are directed into a first sheet storage device (success tray 134) of the sheet storage devices using a sheet feeder under control of the processor in item 208. Further, if a scan is determined to be acceptable in item 206, the processor can direct that the acceptable electronic images be stored within a computer readable storage medium device in item 210. Alternatively, as mentioned above, all images (acceptable and non-acceptable) can be stored.

To the contrary, if a scan is determined not to be acceptable in item 206, such sheets (e.g., "second" sheets) of media corresponding to the non-acceptable electronic images are directed into a second sheet storage device (fail tray 136) of the sheet storage devices using the sheet feeder under control of the processor in item 212. Further, if a scan is determined not to be acceptable in item 206, this exemplary method notifies the user that at least one of the sheets of media comprises a non-acceptable electronic image and has been directed into the second sheet storage device through the user interface in item 214, and needs to be rescanned.

Figure 5:
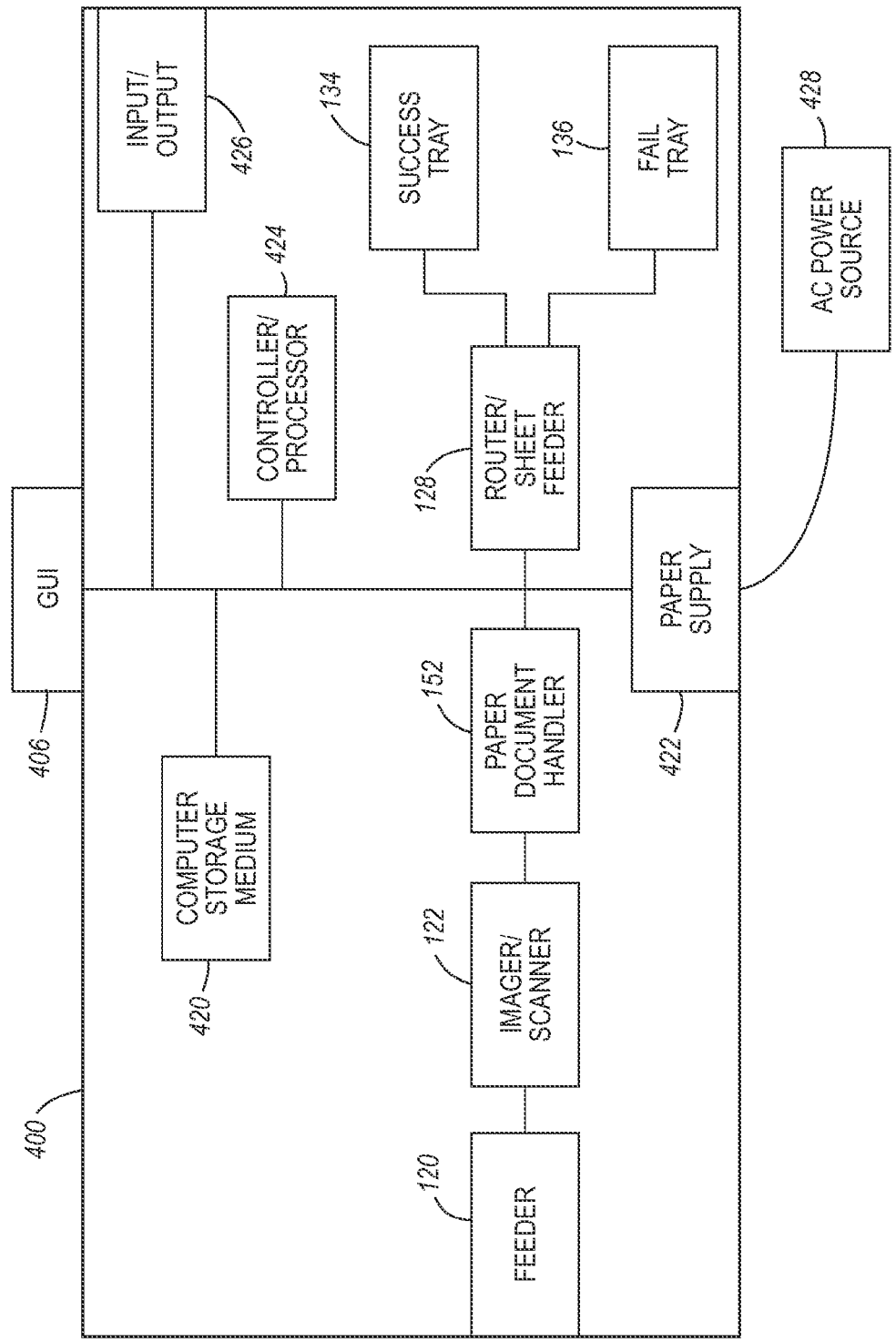
FIG. 5 is a side-view schematic diagram of a device according to embodiments herein.
Figure 6:
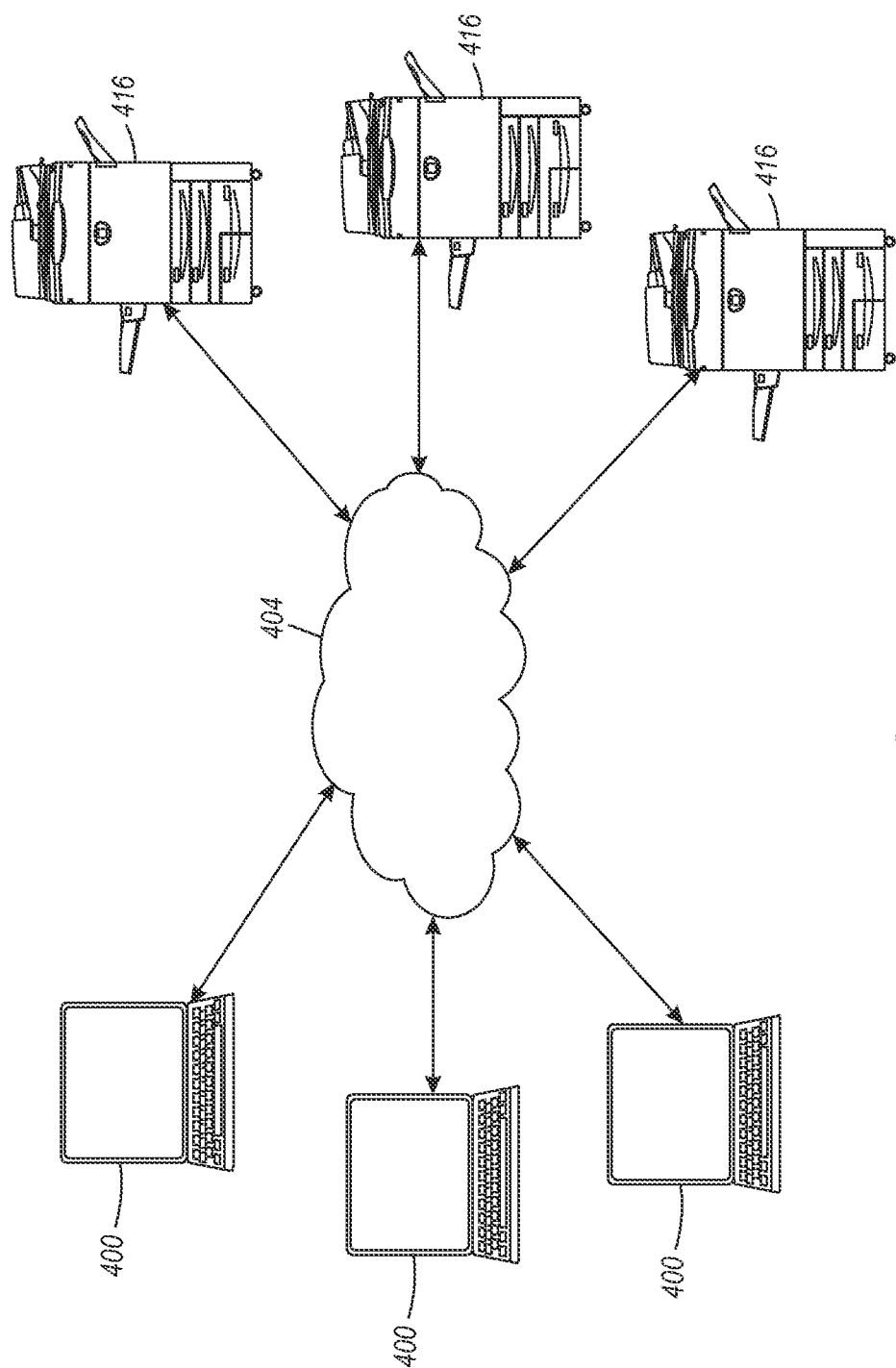
FIG. 6 is a schematic diagram of a system according to embodiments herein.

FIGS. 5 and 6 illustrate exemplary apparatus 400 and network 404 embodiments herein. More specifically, the apparatus includes a controller/processor 424, a communications port (input/output) 426 operatively connected to the processor 424 and to a computerized network 404 external to the computerized device 400/402, and a graphic user interface 406. A power supply 422 connects to an external alternating current power source 428 and converts the external power into the type of power needed by the various components.

A non-transitory computer storage medium device 420 (which can be optical, magnetic, capacitor based, etc.) is readable by the processor 424 and stores instructions that the processor 424 executes to allow the multi-function printing device to perform its various functions, such as those described herein.

The computerized device 400 may part of, or operatively connected to various printing devices 416 and other computerized devices 400 through the computerized network 404. The various printing devices 416 may use different raster image processors, different hardware and software protocols, etc. (which can be optical, magnetic, capacitor based, etc.)

The user interface 406 can receive the user selection of the predetermined standard for scanning the sheets of media. The scanning device (imager 122) optically detects the marks on the sheets of media to produce electronic images of the sheets of media. The processor 424 automatically determines if the electronic images comply with the predetermined standard to classify the electronic images as being acceptable electronic images or non-acceptable electronic images.

The sheet feeder (router 128) is positioned adjacent to the scanning device 122 and is operatively connected to the processor 424. At least two sheet storage devices 134, 136 are positioned adjacent to the sheet feeder. The sheet feeder 128 directs first sheets of media corresponding to the acceptable electronic images into a first sheet storage device 134 under control of the processor 424 and the sheet feeder 128 also directs second sheets of media corresponding to the non-acceptable electronic images into a second sheet storage device 136 under control of the processor 424.

Therefore, as mentioned above, the embodiments herein automatically recognize and notify the local operator of a scan error before the image is shipped to central storage, thereby allowing the sheet to be immediately rescanned. This avoids the need to locate and rescan the document later.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. An apparatus comprising:
   a scanning device that optically detects marks on sheets of media to produce electronic images of said sheets of media;
   a processor operatively connected to said scanning device, said processor automatically determining if said electronic images comply with a predetermined scan quality standard to classify said electronic images as one of acceptable electronic images and non-acceptable electronic images;
   a sheet feeder positioned adjacent to said scanning device and operatively connected to said processor; and
   at least two sheet storage devices positioned adjacent to said sheet feeder,
   said sheet feeder directing first sheets of media corresponding to said acceptable electronic images into a first sheet storage device of said sheet storage devices under control of said processor,
   said sheet feeder directing second sheets of media corresponding to said non-acceptable electronic images into a second sheet storage device of said sheet storage devices under control of said processor,
   said predetermined scan quality standard comprising at least one of:
   a density of said marks on said sheets of media;
   at least one of said marks being located within at least one predefined area of said sheets of media;
   said marks on said sheet of media matching at least one predetermined pattern; and
   said marks on said sheet of media matching at least one predetermined color.

2. The apparatus according to claim 1, further comprising a user interface device operatively connected to said processor, said user interface device notifying a user that at least one of said sheets of media comprises a non-acceptable electronic image and has been directed into said second sheet storage device.

3. The apparatus according to claim 1, further comprising a sheet buffer adjacent said sheet feeder, said sheet buffer temporarily storing said sheets of media while said processor performs said determining of whether said electronic images comply with said predetermined scan quality standard.

4. The apparatus according to claim 1, further comprising a non-transitory computer readable storage medium device operatively connected to said scanning device and said processor, said processor directing said acceptable electronic images to be stored within said computer readable storage medium device.

5. An apparatus comprising:
   a user interface that receives a user selection of a predetermined scan quality standard for scanning sheets of media;
   a processor operatively connected to said user interface;
   a scanning device operatively connected to said processor, said scanning device optically detecting marks on said sheets of media to produce electronic images of said sheets of media, said processor automatically determining if said electronic images comply with said predetermined scan quality standard to classify said electronic images as one of acceptable electronic images and non-acceptable electronic images;
   a sheet feeder positioned adjacent to said scanning device and operatively connected to said processor; and
   at least two sheet storage devices positioned adjacent to said sheet feeder,
   said sheet feeder directing first sheets of media corresponding to said acceptable electronic images into a first sheet storage device of said sheet storage devices under control of said processor,
   said sheet feeder directing second sheets of media corresponding to said non-acceptable electronic images into a second sheet storage device of said sheet storage devices under control of said processor,
   said predetermined scan quality standard comprising at least one of:
   a density of said marks on said sheets of media;
   at least one of said marks being located within at least one predefined area of said sheets of media;
   said marks on said sheet of media matching at least one predetermined pattern; and
   said marks on said sheet of media matching at least one predetermined color.

6. The apparatus according to claim 5, said user interface notifying a user that at least one of said sheets of media comprises a non-acceptable electronic image and has been directed into said second sheet storage device.

7. The apparatus according to claim 5, further comprising a sheet buffer adjacent said sheet feeder, said sheet buffer temporarily storing said sheets of media while said processor performs said determining of whether said electronic images comply with said predetermined scan quality standard.

8. The apparatus according to claim 5, further comprising a non-transitory computer readable storage medium device operatively connected to said scanning device and said processor, said processor directing said acceptable electronic images to be stored within said computer readable storage medium device.

9. A method comprising:
optically detecting marks on sheets of media using a scanning device to produce electronic images of said sheets of media;
automatically determining if said electronic images comply with a predetermined scan quality standard using a processor to classify said electronic images as one of acceptable electronic images and non-acceptable electronic images;
directing first sheets of media corresponding to said acceptable electronic images into a first sheet storage device of said sheet storage devices using a sheet feeder under control of said processor, and
directing second sheets of media corresponding to said non-acceptable electronic images into a second sheet storage device of said sheet storage devices using said sheet feeder under control of said processor,
said predetermined scan quality standard comprising at least one of:
a density of said marks on said sheets of media;
at least one of said marks being located within at least one predefined area of said sheets of media;
said marks on said sheet of media matching at least one predetermined pattern; and
said marks on said sheet of media matching at least one predetermined color.

10. The method according to claim 9, notifying a user that at least one of said sheets of media comprises a non-acceptable electronic image and has been directed into said second sheet storage device through a user interface.

11. The method according to claim 9, further comprising temporarily storing said sheets of media in a sheet buffer while said processor performs said determining of whether said electronic images comply with said predetermined scan quality standard.

12. The method according to claim 9, further comprising directing said acceptable electronic images to be stored within a computer readable storage medium device.

13. A method comprising:
receiving a user selection of a predetermined scan quality standard for scanning sheets of media through a user interface;
optically detecting marks on said sheets of media using a scanning device to produce electronic images of said sheets of media;
automatically determining if said electronic images comply with said predetermined scan quality standard using a processor to classify said electronic images as one of acceptable electronic images and non-acceptable electronic images;
directing first sheets of media corresponding to said acceptable electronic images into a first sheet storage device of said sheet storage devices using a sheet feeder under control of said processor, and
directing second sheets of media corresponding to said non-acceptable electronic images into a second sheet storage device of said sheet storage devices using said sheet feeder under control of said processor,
said predetermined scan quality standard comprising at least one of:
a density of said marks on said sheets of media;
at least one of said marks being located within at least one predefined area of said sheets of media;
said marks on said sheet of media matching at least one predetermined pattern; and
said marks on said sheet of media matching at least one predetermined color.

14. The method according to claim 13, notifying a user that at least one of said sheets of media comprises a non-acceptable electronic image and has been directed into said second sheet storage device through said user interface.

15. The method according to claim 13, further comprising temporarily storing said sheets of media in a sheet buffer while said processor performs said determining of whether said electronic images comply with said predetermined scan quality standard.

16. The method according to claim 13, further comprising directing said acceptable electronic images to be stored within a computer readable storage medium device.

* * * * *